United States Patent [19]
Yano

[11] Patent Number: 5,118,135
[45] Date of Patent: Jun. 2, 1992

[54] PRETENSIONER MECHANISM FOR VEHICLE SEAT BELT

[75] Inventor: Hideaki Yano, Shiga, Japan

[73] Assignee: Takata Corporation, Tokyo, Japan

[21] Appl. No.: 612,923

[22] Filed: Nov. 13, 1990

[30] Foreign Application Priority Data

Nov. 14, 1989 [JP] Japan ................................ 1-295238

[51] Int. Cl.⁵ ............................................ B60R 22/36
[52] U.S. Cl. .................................... 280/806; 100/282; 242/107
[58] Field of Search ................ 280/801, 806; 100/282; 242/107, 107.2

[56] References Cited

U.S. PATENT DOCUMENTS 5,004,178  4/1991  Kobayashi et al. ................. 280/806

FOREIGN PATENT DOCUMENTS

3425526  2/1986  Fed. Rep. of Germany ...... 280/806
2216391  10/1989  United Kingdom ................ 280/806

Primary Examiner—Kenneth R. Rice
Attorney, Agent, or Firm—Brumbaugh, Graves, Donohue & Raymond

[57] ABSTRACT

A pretensioner mechanism for a vehicle seat belt comprises a loading device for applying a preload to the seat belt by pulling a segment of the belt in a direction transverse to a path along which is normally extends. The loading device includes a pulling member having a portion engageable with the belt segment and rotatable about an axis spaced apart from and oriented transversely to said normal path of the belt segment. A one-way clamp engages the belt and substantially prevents release of the applied preload. An interlocking device between the loading device and the clamp operates the clamp in response to movement of the pulling member in a direction opposite to the direction in which it moves to apply the preload to the belt.

5 Claims, 7 Drawing Sheets

PRETENSIONER MECHANISM FOR VEHICLE SEAT BELT

DESCRIPTION

Background of he Invention

The present invention relates to vehicle seat belt systems and, in particular, to a pretensioner mechanism for a vehicle seat belt.

Vehicles such as automobiles are almost universally equipped with a seat belt system for firmly restraining the body of an occupant of the vehicle in case of collision and for preventing a secondary collision between the occupant and a part of the vehicle.

When the body of an occupant is held firmly on a seat by a seat belt, it is desirable to eliminate any gap between the body and the seat belt (hereinafter simply referred to as "belt") to exert a proper restraining force and to limit as much as possible the movement of body due to inertia in a collision. However, because the occupant normally dislikes a feeling of pressure exerted by the belt and also because physical fatigue occurs less frequently if the occupant can change posture freely, it is desirable to leave some space between the belt and the body.

To satisfy the desire to have a seat belt system in which the belt fits loosely to the body, but is tightened to restrain the body in a collision, a pretensioner has been developed that tightens the belt in an emergency and restrains the body of the occupant by a proper restraining force. In one previously proposed pretensioner mechanism, a certain length of the belt is wound onto a retractor reel. In another pretensioner unit, the belt is pulled against the locked retractor reel. Japanese Provisional Patent Publication 54-149131 describes and shows a pretensioner of this type. Japanese Provisional Patent Publications 61-160339 and 63-22752 describe and show a mechanism combined with a pretensioner unit for more reliable operation by clamping the belt in a tighter state.

Figure 8:
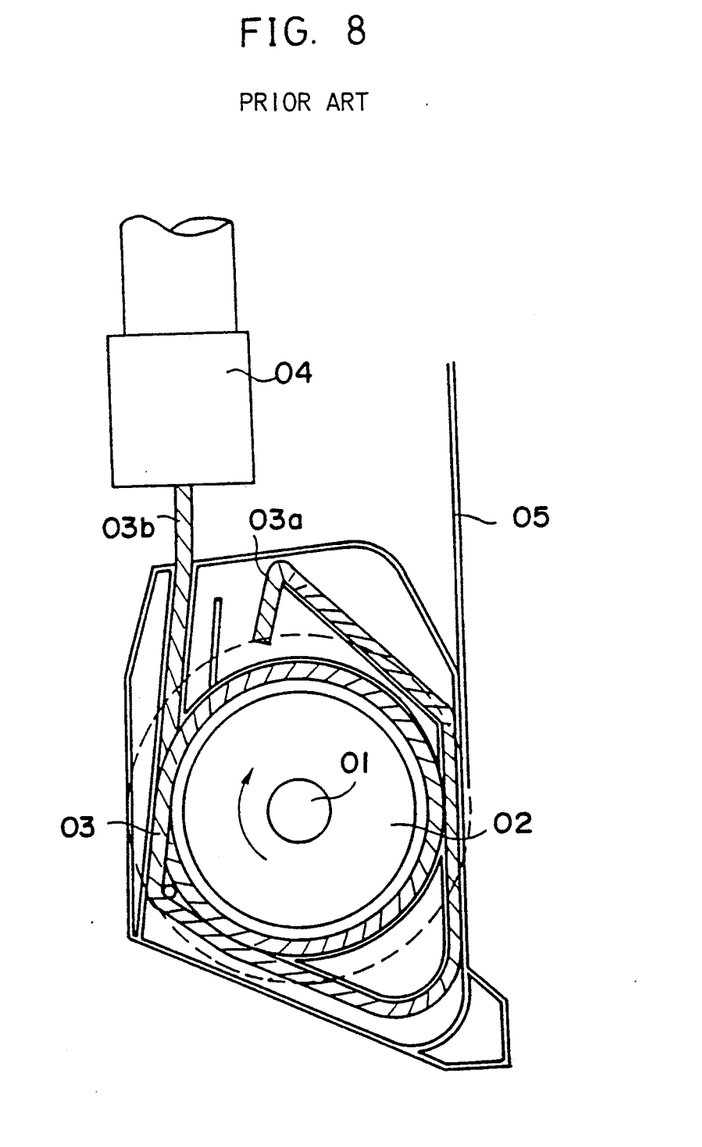
FIG. 8 is a generally schematic side view of a retractor provided with a known type of pretensioner mechanism.

FIG. 8 shows an example of a retractor furnished with a known type of pretensioner mechanism. A pulley 02 is mounted on one end of a reel shaft 01 of an otherwise conventional belt retractor, and a wire rope 03 made of metal stranded wire is wound in two or more turns on the outer periphery of the pulley 02 with a certain gap. One end 03a of the wire rope 03 is fastened on the retractor, and the other end 03b is connected to a pulling device 04.

When a sudden acceleration caused by a collision of the vehicle is detected by an acceleration detector, gunpowder in the pulling device is ignited by an electrical signal produced by the detector and conducted to the pulling device 04. The pulling device 04 is operated and pulls the end 03b of the wire rope 03. Because the other end 03a of the wire rope is fastened to the frame of the retractor, the diameter of the rope turns on the pulley is reduced and the wire rope tightens about the outer periphery of the pulley 02. The pulley is then rotated as the fastening portion of the main unit of the retractor is removed, and the pulley 02 is rotated clockwise by the transmission of rotating power due to mutual friction force. The rotation of the pulley 02 causes rotation of the reel shaft 01, and the belt 05 is wound on the reel shaft 01 and pulled in. Thus, the slack of the belt 05 is eliminated, and the belt closely fits the body of the occupant, increasing the restraining effect.

In the pretensioner mechanism of FIG. 8, the transmission of the rotating power from the pulling device 04 to the reel shaft 01 depends upon mutual transmission of friction forces between the pulley 02 and the wire rope 03. This means that its operation is considerably affected by the conditions of the friction surfaces. Accordingly, it is very difficult to decrease the variations in the length of the belt 05 to be wound in. As the result, the operation of the mechanism often produces insufficiently close fitting of the belt 05 to the body of the occupant or excessive tightening of the belt.

Also, when a pulling force is applied to the belt 05 by the body of the occupant, who is being thrown forward by inertia, the turns of the belt 05 wound on the reel tend to be tightened. Thus, despite the fact that the reel shaft 01 is prevented from rotating by the emergency locking mechanism of the retractor, a segment of the belt 05 is released from the reel, the belt is slackened, and the desired result of restraining the occupant firmly is not completely attained.

On the other hand, in a device in which a clamp mechanism is combined with a pretensioner mechanism for more reliable operation, the operations of applying a preload to the belt and clamping the belt are performed simultaneously, and a more complicated mechanism has to be adopted to carry out such operations. This often leads to disadvantages in terms of the manufacturing cost.

SUMMARY OF THE INVENTION

One object of the present invention is to provide a pretensioner mechanism that operates reliably to tighten a seat belt properly against the body of a vehicle occupant. Another object is to provide such a mechanism that is of relatively simple construction and can, therefore, be manufactured economically.

There is provided, in accordance with the present invention, a pretensioner mechanism for a vehicle seat belt comprising a loading device for applying preload to the seat belt by pulling a segment of the belt in a direction transverse to a path along which it normally extends. The loading device includes a pulling member having a portion engageable with the belt segment and rotatable about an axis spaced apart from and oriented transversely to said path. A one-way clamp device substantially prevents release of the applied preload. An interlocking device between the loading device and the clamp device operates the clamp device in response to movement of the pulling member in a direction opposite to the direction in which it moves to apply the preload to the belt.

In an embodiment the loading device includes a load lever mounted for rotation about the axis of rotation of the pulling member, and the pulling member is a load bar affixed to the lever in spaced-apart relation to said axis and engageable with the belt segment upon rotation of the lever in one direction. The loading device includes a motive power source for rotating the lever in a direction to engage the load bar with the belt segment and move the segment transversely to the path. The clamp device of the embodiment includes a first clamp member on one side of the path of the belt that is supported proximate to the path of the belt against movement away from the belt and a second clamp member on the other side of the path of the belt that is carried by a pivotably mounted clamp lever for movement along an arc toward and away from the first clamp member such as to clamp the belt against the first clamp member upon movement toward the first clamp member. Furthermore, in the embodiment, the load lever is mounted on a shaft for rotation therewith, and the interlocking device includes a ratchet gear affixed to the shaft and a ratchet pawl pivotably coupled to the clamp lever and biassed pivotally into engagement with the ratchet gear.

For a better understanding of the invention reference may be made to the following description of an exemplary embodiment, taken in conjunction with the accompanying drawings.

DESCRIPTION OF THE EMBODIMENT

The embodiment shown in FIGS. 1 to 4 comprises a loading device 2 for pulling a segment of a belt 1 in a direction transverse to a path along which it normally extends and a one-way clamp 3 for preventing the release of the preload applied on the belt 1 by the loading device 2. An interlocking mechanism 4 that operates the one-way clamp 3 by way of the return operation of the loading device 2 is interposed between the loading device 2 and the one-way clamp 3.

Figure 2:
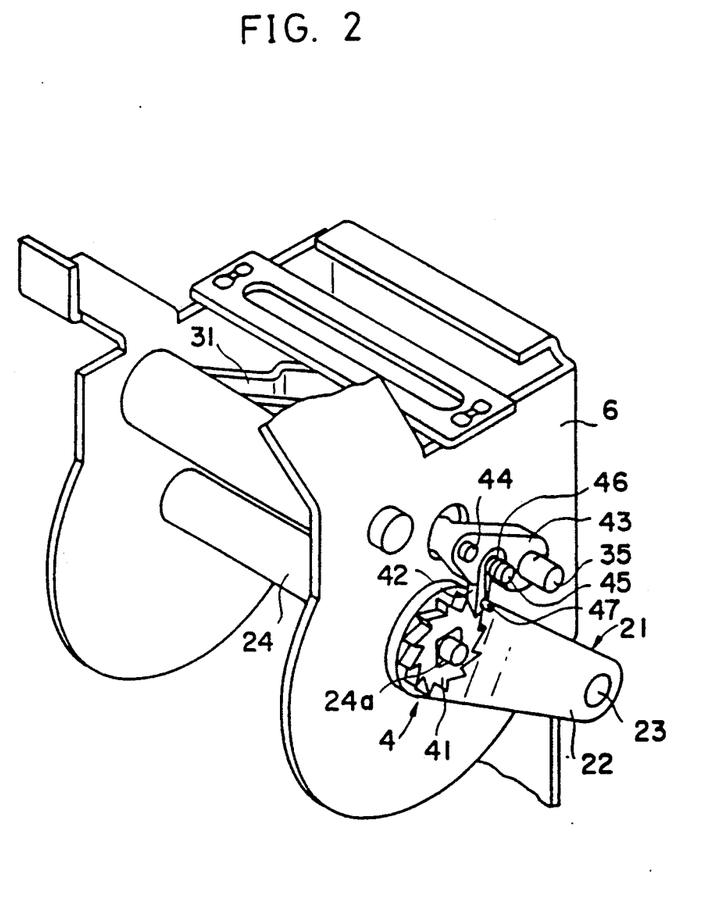
FIG. 2 is a partial pictorial view of the embodiment of FIG. 1.

Referring to FIG. 2, the interlocking mechanism 4 comprises a ratchet gear 41 mounted on a rotating shaft 24 so as to rotate with the shaft and a load lever 22 on the shaft, which constitutes a part of the rotating pulling member 21 of the loading device 2, and a ratchet pawl 42 mounted on a clamp lever 31 of the one-way clamp 3 and biassed by a spring relative to the lever 31 to engage the ratchet gear 41.

Figure 3:
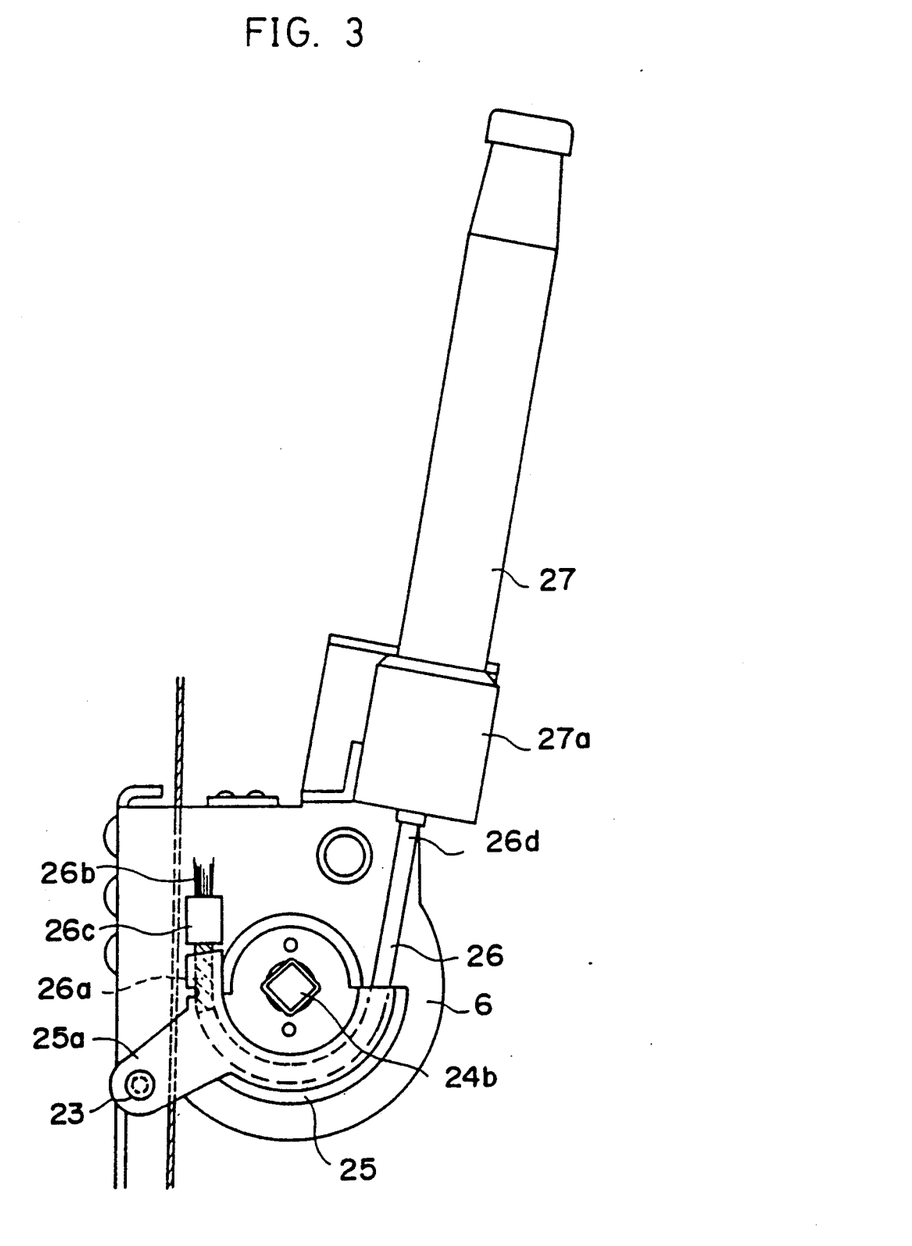
FIG. 3 is a left side view of the embodiment of FIG. 1.

The loading device 2 is mounted on a frame 6, which also carries a belt retractor 5. As shown in FIG. 2 (right side view), the rotating shaft 24 is rotatably supported on the frame 6, and the load lever 22 of the rotating pulling member 21 is mounted on a square portion 24a on one end of the rotating shaft 24. As shown in FIG. 3 (left side view), two plates having grooves on their outer peripheries are joined together to form a semi-circular pulley 25 that is mounted on a square portion 24b on the other end of the shaft 29. A load bar 23 is connected between the end of the load lever 22 and the end of an arm 25a of the pulley 25. A wire rope 26 is wrapped over the semicircular outer peripheral groove of the pulley 25. One end 26a of the wire rope 26 is captured by a bent over tab of the plate of the pulley 25, and a stop block 26c is pressed onto the termination 26b. The other end 26d of the wire rope 26 is connected to the motive power source (the pulling device as described above in this example). The motive power source 27 is of a known construction, and a description is not given here. The base end 27a, which has a built-in ignition device, of the motive power source 27 is fastened on the frame 6 by screws at two points.

Figure 1:
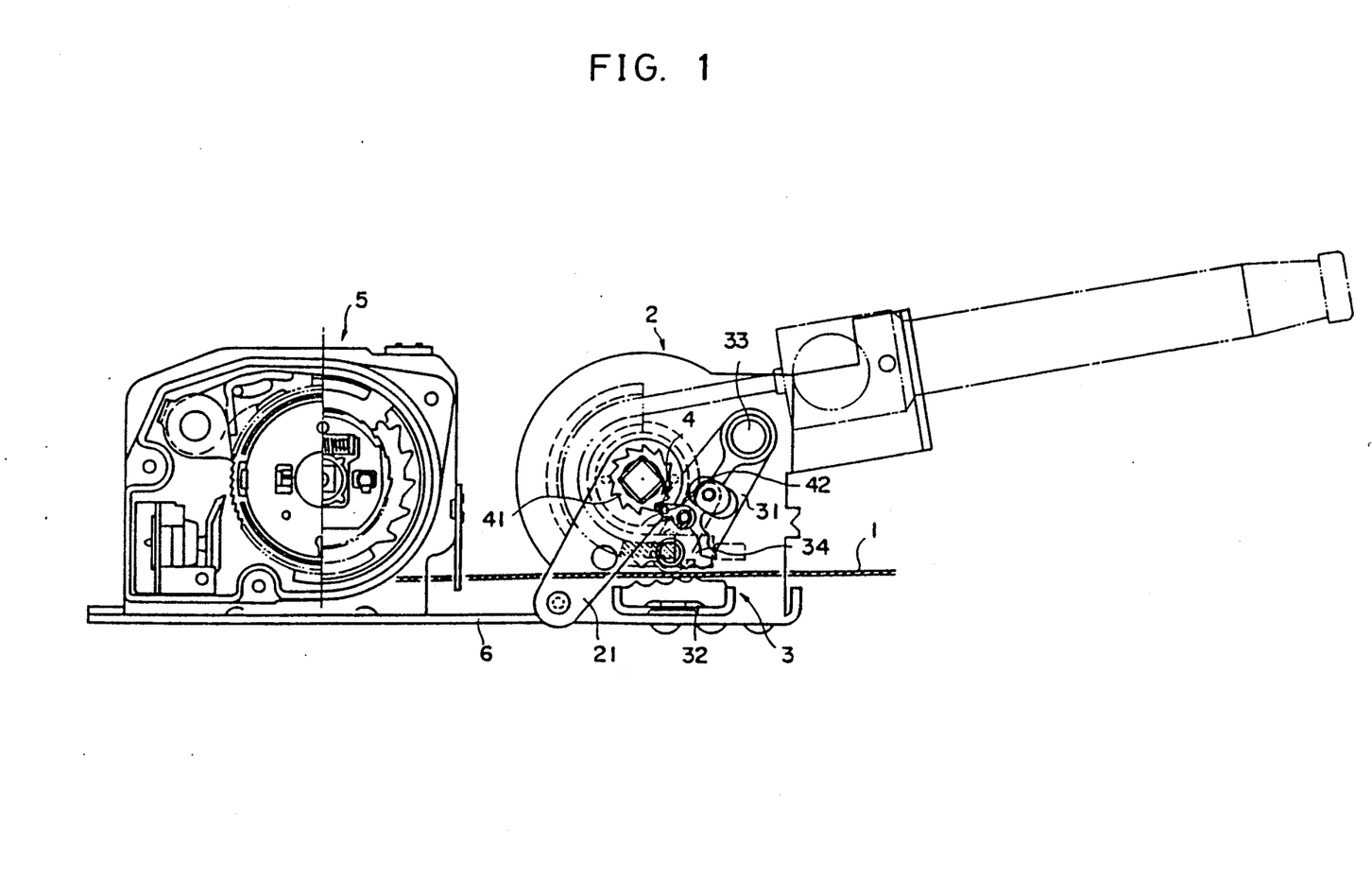
FIG. 1 is a side view of an embodiment of a pretensioner unit that is associated with a belt retractor.

A one-way clamp 3 is incorporated in the frame 6 in proximity to the loading device 2 (see FIG. 1). It includes a clamp lever 31 and a clamp shoe 32. The clamp lever 31 is pivotally supported on the frame 6 by a clamp lever-supporting shaft 33, and its distal end is provided with a clamp jaw 34. The clamp shoe 32 is located face-to-face opposite the clamp jaw 34 proximate to the belt, is supported by the base of frame 6 against movement away from the belt, and is mounted on the frame 6 so that is can slide parallel to the path of movement of the belt. Although not shown in the figure, a return spring, such as a leaf spring acting between the clamp shoe 32 and the frame 6, pulls the clamp shoe 32 toward the releasing direction (leftward in the figure).

Referring again to FIG. 2, the interlocking mechanism 4 includes the ratchet gear 41 and the ratchet pawl 42 (described above) and a pawl lever 43. The ratchet gear 41, it will be recalled, is affixed on one end of the rotating shaft 24. The base end of the ratchet pawl 42 is pivotally mounted on the pawl lever 42 through a pawl supporting pin 45, and one end of the pawl lever 43 is pivotally coupled to the clamp lever 31 by a lever-supporting pin 44 that is received in an elongated hole in the pawl lever oriented lengthwise of the pawl lever. The other end of the pawl lever is rotatably connected to the frame 6 by a pin 35. The clamp lever 31 and the pawl lever 42 constitute a compound lever mechanism. A coil torsion spring 46 is received on the pin 45. One of the free ends of the coil spring 46 engages a spring-supporting pin 47 near the tip end of the ratchet pawl 42, and the other end engages the pin 35 of the pawl lever 43. Accordingly, the spring 46 biases the tip of the pawl 42 relative to the compound lever mechanism toward the ratchet gear 42.

FIGS. 1 to 3 show the condition of the mechanism before a preload is applied to the belt. The rotating pulling member 21 is at such position that the load bar 23 is in contact with the frame 6. Although not shown in those figures, belt guide bars 28 and 29 are mounted on the frame 6, and as is evident from FIGS. 4B and 4C, one on the retractor side and the other on the pretensioner side of the path of the load bar 23, in order to support and guide the deflected portion of the belt 1 when it is pulled.

In the pretensioner mechanism with the above arrangement, one end of the belt 1 is normally fastened at an anchor point by a through-anchor, and the other end is wound onto the retractor 5. The retractor maintains the belt 1 close to the body of the vehicle occupant.

Figure 4A:
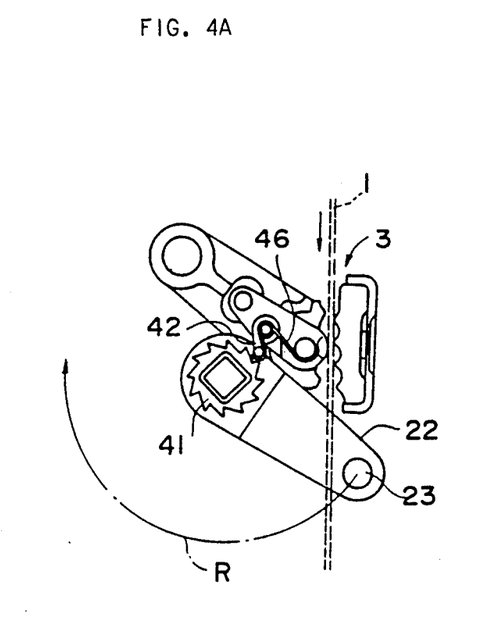
FIGS. 4A, 4B and 4C are generally schematic side views of the pretensioner of FIG. 1 in different stages of operation.
Figure 4B:
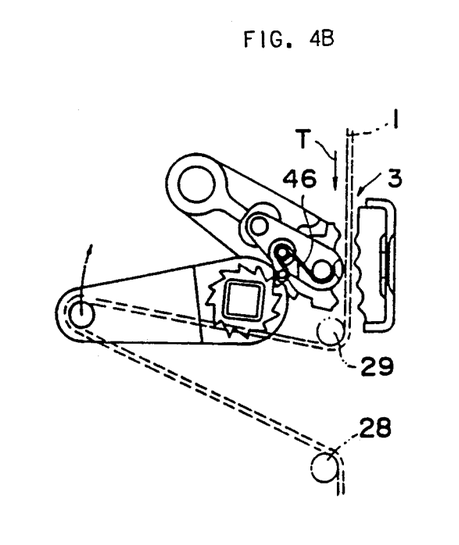
Figure 4C:
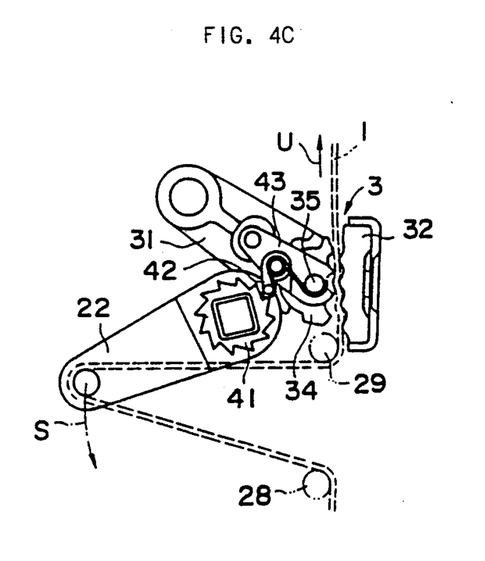

The positional relationship of the components of the pretensioner mechanism in its inactive condition is shown in FIG. 4A. The load lever 22 of the preloader 2 is in a non-operating position, the load bar 23 is at a position clear of the belt 1, and the one-way clamp 3 is not engaged with the belt.

When a high acceleration occurs due to a collision of the vehicle, the acceleration is detected by the acceleration detecting device, which may be of a conventional type, and the motive power source 27 is instantly operated. At the same time, the locking mechanism of the emergency locking retractor is conditioned to lock the belt reel against rotation in the belt-unwinding direction. By operation of the motive power source 27, the end 26d of the wire rope 26 (FIG. 3) is pulled, and the pulley 25 is rotated counterclockwise (with respect to FIG. 3). As the rotating shaft 24 is rotated in that direction, the load lever 22 is rotated clockwise, as shown by the arrow R in FIG. 4A (and with respect to FIG. 4A). By this action, the belt 1 is pulled by the load bar 23 in the direction transverse to its path between the guide bars 28 and 29 to the position shown in FIG. 4B.

The length of the belt 1 in its extending direction between the mechanism and the anchor is decreased by the length of the segment pulled in the transverse direction. It is pulled in the direction shown by the arrow T in FIG. 4B, and a preload is applied to the belt 1. Except to the extent that the belt turns on the belt reel may tighten and release some of the belt from the retractor, the belt 1 is not pulled from the retractor reel shaft, because the reel shaft is prevented from rotating by the emergency locking mechanism.

When a load is applied in the direction of the arrow U to release the preload on the belt 1 by the inertia of the body of the occupant acting on the belt (FIG. 4C), the load lever 22 is rotated counterclockwise (arrow S in FIG. 4C) by the return action. The clamp lever 31 is operated to tighten the one-way clamp 3 through the interlocking mechanism 4. The one-way clamp 3 grips the opposite sides of the belt 1 between the clamp jaw 34 on the end of the clamp lever 31 and the clamp shoe 32, and the release of the preload and pulling out of the belt in the direction U are prevented.

Describing this operation in detail, the ratchet pawl 42, engaged with the teeth of the ratchet gear 41 under the bias of the spring 46, is pushed against the deflection force of the spring 46 each time the ratchet pawl 42 passes over the tip of a ratchet gear 41 when the load lever 22 is rotated in the preload-applying direction (shown by the arrow R in FIG. 4A), thus allowing clockwise rotation of the ratchet gear 41. On the other hand, when the load lever 22 is pulled by the belt in the preload-releasing direction (counterclockwise, the arrow S in FIG. 4C), the ratchet pawl 42 engages a tooth of the ratchet gear 41. Counterclockwise rotation of the ratchet gear 41 results in the application of a force to the ratchet pawl 42, which force is transmitted to the clamp lever 31 through the lever-supporting pin 44 as a force acting counterclockwise. The clamp jaw 34 mounted on its tip is rotated counterclockwise together with the clamp lever 31, and the one-way clamp 3 engages and holds the belt.

It is possible with the pretensioner unit of this embodiment to pull a segment of the belt 1 in a lateral direction having a length nearly twice as long as the diameter of the path of rotation of the load bar 23 when the preload to eliminate the slack in the belt 1 is applied. Accordingly, the invention makes it possible to restrain very effectively the body of the vehicle occupant in an emergency.

In the above description, the features of the invention are those of an exemplary embodiment, whereas the present invention is not limited to that embodiment, and various modifications and variations of the embodiment can be made that are within the scope of the appended claims. For example, as the motive power source to drive the rotating pulling member, a powerful spring may be used in lieu of gunpowder.

Figure 5:
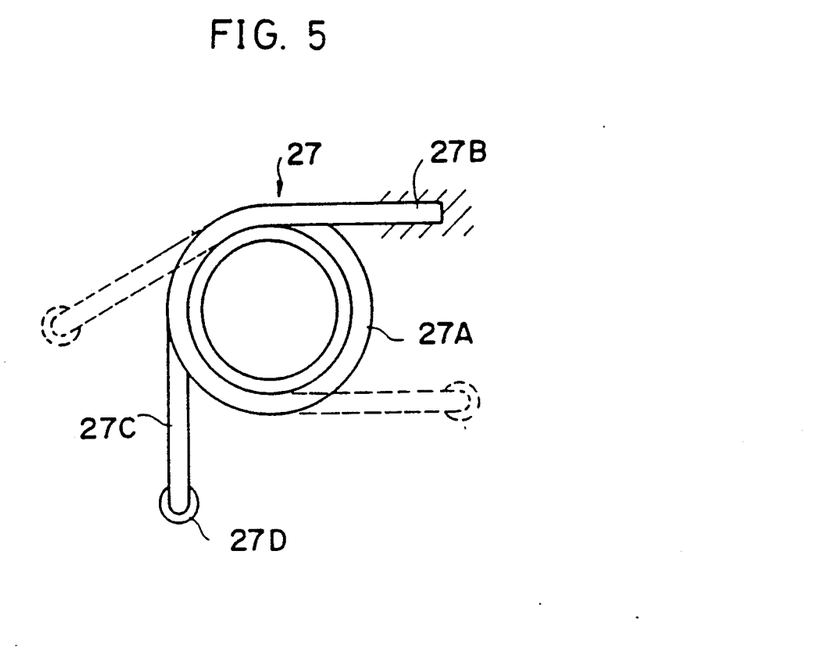
FIG. 5 is a side view of a torsion coil spring that can be used as a motive power source in a pretensioner mechanism.
Figure 6:
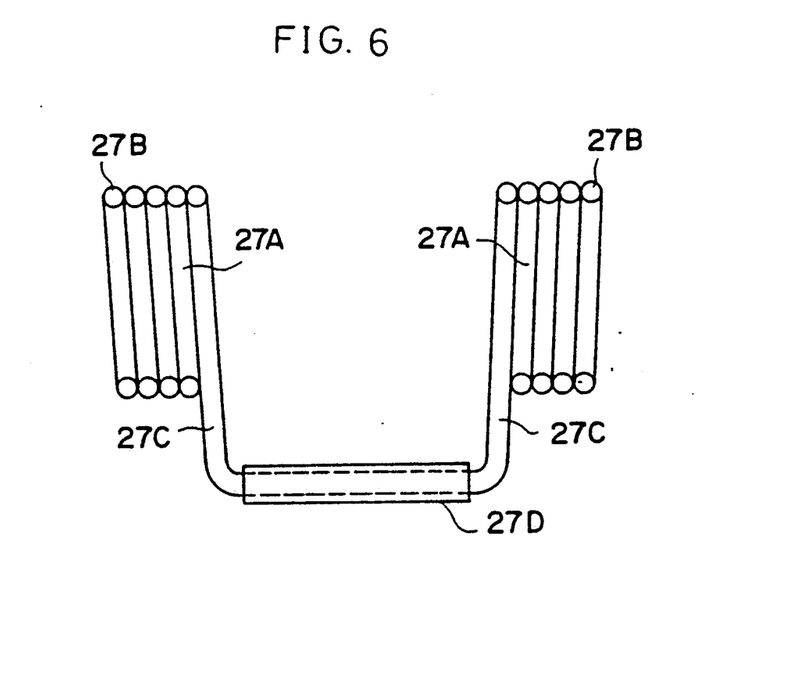
FIG. 6 is a front view of the spring of FIG. 5.

FIGS. 5 and 6 show an example of such a spring. It is a torsion coil spring 27 that includes two coils 27A wound coaxially and two legs 37C that extend in a tangential direction, are bent laterally and are connected to each other. Legs 27B are affixed to the frame. When this spring is used, it can serve as both the power source and the rotating pulling member. The device can be designed in an extremely compact form if a portion 27D is used as the load bar to move a segment of the belt laterally. If such a motive power source is used, there is no need to replace it after operation. The spring is suitable for use in a mechanism that operates at a lower acceleration than in the conventional case.

Figure 7:
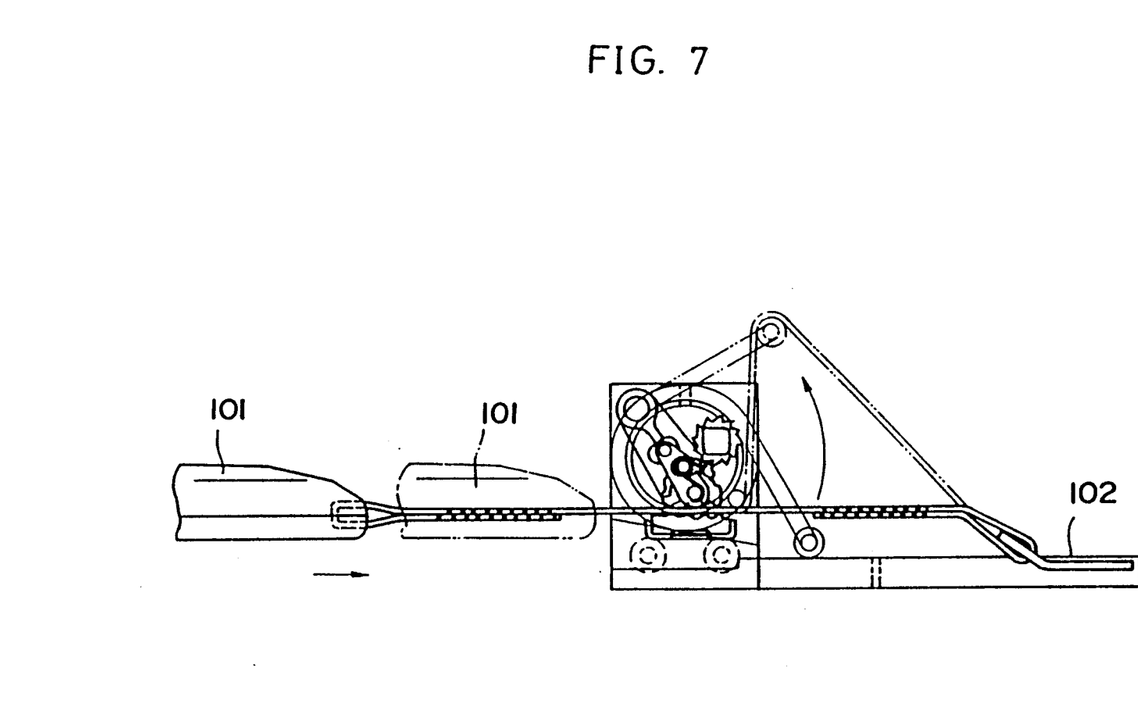
FIG. 7 is a side view of a pretensioner mechanism installed at a position between a buckle and an anchor point.

In the above-described embodiment, the pretensioner mechanism is located near the retractor, along the path of the belt as it leads to the occupant from the retractor reel; other positions are suitable, generally any position between the body of the occupant and an anchor point of the belt system. For example, FIG. 7 shows an arrangement in which the pretensioner mechanism is located at a position in between a buckle 101, to which the restraining section of the belt is attached, and an anchor point 102 for a length of belt to which the buckle is attached.

According to other modifications of the mechanism, the interlocking mechanism may be a device utilizing friction force or one utilizing a cam mechanism, such as a cam clutch.

Because the belt is directly pulled by the rotating pulling member to apply a preload on the belt by a pretensioner mechanism according to the present invention, it is possible to have a pulling stroke sufficient to eliminate the slackening of the belt, and the reliable application of the preload is ensured.

Because the operation of a loading device and that of a one-way clamp are interrelated by an interlocking mechanism, and the loading device and the one-way clamp are designed as independent mechanisms, a reliable operating mechanism can be of relatively simple design, and the manufacturing cost can be reduced.

I claim:

1. A pretensioner mechanism for a vehicle seat belt comprising loading means for applying a preload to the seat belt by pulling a segment of the belt in a direction transverse to a path along which such segment normally extends, the loading means including a pulling member having a portion engageable with the belt segment and rotatable about an axis spaced apart from and oriented transversely to said path, one-way clamp means for substantially preventing release of the applied preload, and interlocking means between the loading means and the clamp means for operating the clamp means in response to movement of the pulling member in a direction opposite to the direction in which it moves to apply the preload to the belt.

2. A pretensioner mechanism according to claim 1 wherein the pulling member of the loading means includes a load lever mounted for rotation about said axis, and a load bar affixed to the lever in spaced-apart relation to said axis, and wherein the loading means includes a a motive power source for rotating the load lever in a direction to engage the load bar with the belt segment and move the segment transversely to the path.

3. A pretensioner mechanism according to claim 1 wherein the clamp means includes a first clamp member on one side of the path of the belt supported proximate to the path of the belt against movement away from the belt and a second clamp member on the other side of the path of the belt carried by a pivotably mounted clamp lever for movement along an arc toward and away from the for movement along an arc toward and away from the against the first clamp member upon pivotal movement toward the first clamp member.

4. A pretensioner mechanism according to claim 3 wherein the pulling member of the loading means includes a load lever mounted for rotation about said axis, and a load bar affixed to the lever in spaced-apart relation to said axis, and wherein the loading means includes a motive power source for rotating the load lever in a direction to engage the load bar with the belt segment and move the segment transversely to the path.

5. A pretensioner mechanism according to claim 4 wherein the load lever is mounted on a shaft for rotation therewith and wherein the interlocking means includes a ratchet gear affixed to the shaft and a ratchet pawl pivotably coupled to the clamp lever and biassed pivotally into engagement with the ratchet gear.

* * * * *

UNITED STATES PATENT AND TRADEMARK OFFICE
CERTIFICATE OF CORRECTION

PATENT NO. : 5,118,135
DATED : June 2, 1992
INVENTOR(S) : Yano

It is certified that error appears in the above-identified patent and that said Letters Patent is hereby corrected as shown below:

Col. 1, line 39, "mechanism" should read --clamp mechanism--.

Col. 6, line 68, and col. 7, line 1, delete "for movement along an arc toward and away from the against the".

Col. 7, line 1, "member" should read --member such as to clamp the belt against the first clamp member--.

Signed and Sealed this

Thirtieth Day of November, 1993

Attest:

BRUCE LEHMAN

Attesting Officer

Commissioner of Patents and Trademarks